US010351099B2

(12) United States Patent
Liubakka et al.

(10) Patent No.: US 10,351,099 B2
(45) Date of Patent: Jul. 16, 2019

(54) VEHICULAR KEYLESS ENTRY SYSTEM

(71) Applicant: Dura Operating, LLC, Auburn Hills, MI (US)

(72) Inventors: Michael Kenneth Liubakka, Northville, MI (US); Nizar Trigui, Addison Township, MI (US); Thomas Farges, Gometz le chattel (FR)

(73) Assignee: Dura Operating, LLC, Auburn Hills, MI (US)

( * ) Notice: Subject to any disclaimer, the term of this patent is extended or adjusted under 35 U.S.C. 154(b) by 133 days.

(21) Appl. No.: 15/307,557

(22) PCT Filed: Apr. 30, 2015

(86) PCT No.: PCT/US2015/028620
§ 371 (c)(1),
(2) Date: Oct. 28, 2016

(87) PCT Pub. No.: WO2015/168459
PCT Pub. Date: Nov. 5, 2015

(65) Prior Publication Data
US 2017/0050616 A1    Feb. 23, 2017

Related U.S. Application Data

(60) Provisional application No. 61/986,619, filed on Apr. 30, 2014.

(51) Int. Cl.
*H01Q 1/32* (2006.01)
*B60R 25/24* (2013.01)
(Continued)

(52) U.S. Cl.
CPC .............. *B60R 25/24* (2013.01); *B60R 25/23* (2013.01); *G07C 9/00309* (2013.01);
(Continued)

(58) Field of Classification Search
CPC ... B60R 25/24; B60R 25/23; B60R 2325/103; H01Q 7/00; H01Q 1/2291; H01Q 1/3241;
(Continued)

(56) References Cited

U.S. PATENT DOCUMENTS 4,778,206 A * 10/1988 Matsumoto ........ G07C 9/00182
292/201
5,204,672 A    4/1993 Brooks
(Continued)

FOREIGN PATENT DOCUMENTS

CN    102673517 A    9/2012
CN    103625425 A    3/2014
(Continued)

OTHER PUBLICATIONS

EP Extended Search Report for EP Application No. 15785463.9 dated Nov. 7, 2017 (6 pages).
(Continued)

*Primary Examiner* — Hai V Tran
*Assistant Examiner* — Awat M Salih
(74) *Attorney, Agent, or Firm* — Reising Ethington P.C.; Matthew J. Schmidt; Robert E. Ford

(57) ABSTRACT

A keyless entry system may include one or more Near Field Communication (NFC) devices. Also described herein is a keyless entry system including a NFC device and a keypad. In a particular embodiment there is provided a vehicular keyless entry system that is integrated with a vehicle trim component. Some implementations include an antenna carried by or embedded in the trim component.

24 Claims, 5 Drawing Sheets

(51) Int. Cl.
  *G07C 9/00* (2006.01)
  *B60R 25/23* (2013.01)
  *H01Q 1/22* (2006.01)
  *H01Q 1/38* (2006.01)
  *H01Q 7/00* (2006.01)
  *H04B 5/00* (2006.01)

(52) U.S. Cl.
  CPC ....... *G07C 9/00674* (2013.01); *H01Q 1/2291* (2013.01); *H01Q 1/3241* (2013.01); *H01Q 1/38* (2013.01); *H01Q 7/00* (2013.01); *H04B 5/0031* (2013.01); *B60R 2325/103* (2013.01); *G07C 2009/00325* (2013.01); *G07C 2009/00769* (2013.01)

(58) Field of Classification Search
  CPC .... H01Q 1/38; H04B 5/0031; G07C 9/00309; G07C 9/00674; G07C 2009/00769; G07C 2009/00325
  See application file for complete search history.

(56) References Cited

U.S. PATENT DOCUMENTS

| | | | |
|---|---|---|---|
| 6,288,652 | B1 | 9/2001 | Bedi et al. |
| 7,248,151 | B2 | 7/2007 | McCall |
| 7,255,466 | B2 | 8/2007 | Schmidt et al. |
| 7,259,679 | B2 | 8/2007 | Yoshida et al. |
| 7,327,215 | B2 | 2/2008 | McCall et al. |
| 7,350,949 | B2 | 4/2008 | Meinke et al. |
| 7,400,232 | B2 | 7/2008 | Reichling et al. |
| 7,518,381 | B2 | 4/2009 | Lamborghini et al. |
| 7,547,058 | B2 | 6/2009 | King et al. |
| 7,577,406 | B2 | 8/2009 | Nakagawa et al. |
| 7,866,728 | B2 | 1/2011 | Suzuki |
| 8,126,450 | B2 | 2/2012 | Howarter et al. |
| 8,232,863 | B2 | 7/2012 | Nakajima et al. |
| 8,299,895 | B2 | 10/2012 | Harris |
| 8,324,910 | B2 | 12/2012 | Lamborghini et al. |
| 8,400,265 | B2 | 3/2013 | Sarioglu et al. |
| 8,410,899 | B2 | 4/2013 | Stevenson et al. |
| 8,451,087 | B2 | 5/2013 | Krishnan et al. |
| 8,534,743 | B2 | 9/2013 | Scheler |
| 8,538,408 | B2 | 9/2013 | Howarter et al. |
| 8,588,715 | B2 | 11/2013 | Kimura et al. |
| 8,648,832 | B2 | 2/2014 | Maloof et al. |
| 8,700,267 | B2 | 4/2014 | Lange |
| 8,798,809 | B2 | 8/2014 | Kalhous et al. |
| 2005/0242923 | A1 | 11/2005 | Pearson |
| 2007/0252728 | A1 | 11/2007 | Wisherd |
| 2008/0296929 | A1 | 12/2008 | Suzuki et al. |
| 2009/0108989 | A1 | 4/2009 | Sinclair |
| 2010/0128570 | A1 | 5/2010 | Smith et al. |
| 2010/0219935 | A1 | 9/2010 | Bingle et al. |
| 2011/0101734 | A1* | 5/2011 | Gunther .............. B62D 25/04 296/193.06 |
| 2011/0112969 | A1 | 5/2011 | Zaid et al. |
| 2012/0032463 | A1 | 2/2012 | Gerndorf et al. |
| 2012/0306618 | A1 | 12/2012 | Tieman et al. |
| 2013/0082820 | A1* | 4/2013 | Tieman .............. G07C 9/00309 340/5.61 |
| 2013/0102263 | A1 | 4/2013 | Forgerit et al. |
| 2013/0194068 | A1 | 8/2013 | Monig et al. |
| 2013/0259232 | A1 | 10/2013 | Petel |
| 2013/0271327 | A1 | 10/2013 | Oohara |
| 2013/0278381 | A1 | 10/2013 | Lopez et al. |
| 2014/0114504 | A1 | 4/2014 | Yamashita et al. |
| 2014/0228142 | A1* | 8/2014 | Beno ..................... A63B 60/00 473/223 |
| 2014/0320353 | A1* | 10/2014 | Lin ........................ H01Q 21/00 343/702 |
| 2015/0202962 | A1* | 7/2015 | Habashima ............ B60K 35/00 345/633 |
| 2015/0221146 | A1 | 8/2015 | Ieda |

FOREIGN PATENT DOCUMENTS

| | | |
|---|---|---|
| WO | WO2012022637 A1 | 2/2012 |
| WO | WO2012143162 A1 | 10/2012 |
| WO | WO2014046056 A1 | 3/2014 |

OTHER PUBLICATIONS

CN Office Action for CN Application No. 201580023556.5 dated Apr. 16, 2018 (11 pages).
Written Opinion & International Search Report for PCT/US2015/028620 dated Aug. 21, 2015, 14 pages.
CN Office Action for CN Application No. 201580023556.5 dated Dec. 4, 2018 (7 pages).

* cited by examiner

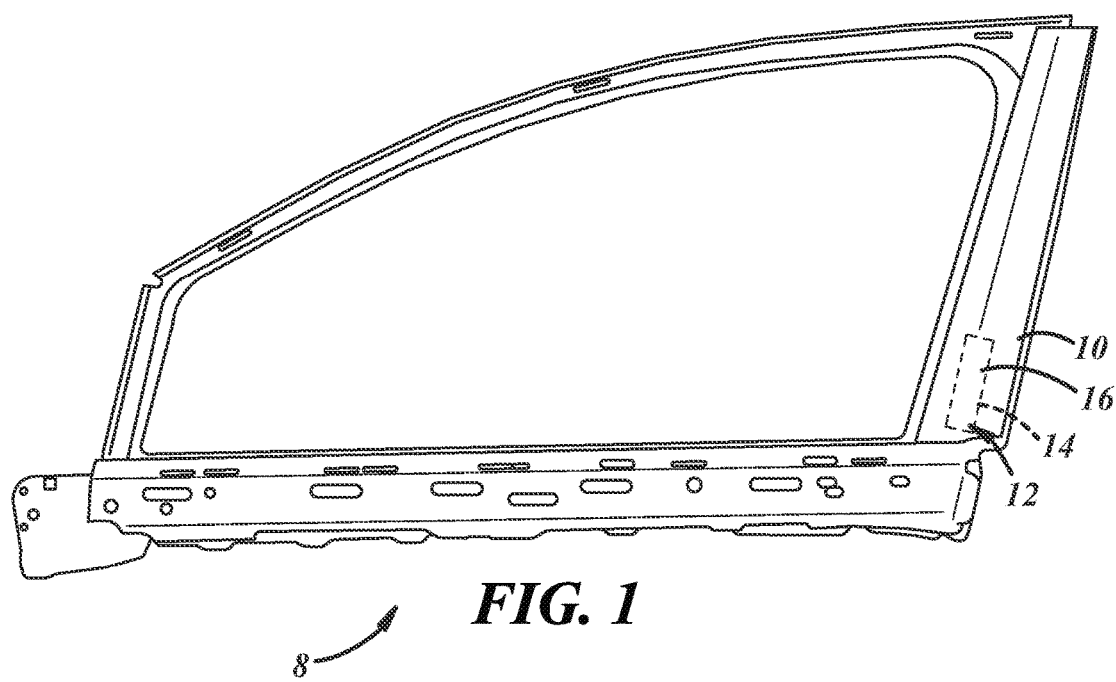
FIG. 1
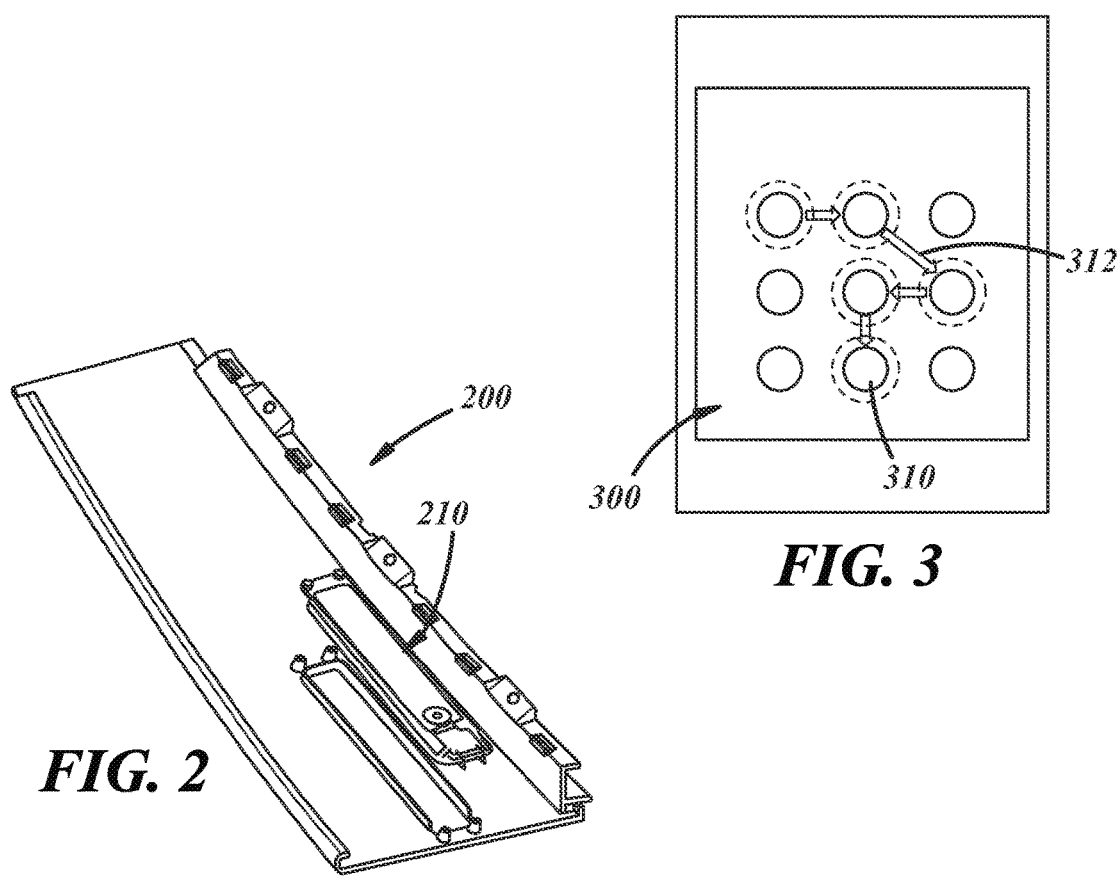
FIG. 2
FIG. 3 ns VEHICULAR KEYLESS ENTRY SYSTEM

REFERENCE TO COPENDING APPLICATIONS

This application claims the benefit of U.S. Provisional Patent Application. Ser. No. 61/986,619 filed Apr. 30, 2014 which is incorporated herein by reference in its entirety.

TECHNICAL FIELD

The invention relates to keyless entry systems for vehicles.

BACKGROUND

Traditionally, keyless entry systems have allowed users to enter a vehicle without inserting a key into a keyhole. Keyless entry systems for vehicles are desirable for users because of convenience. These systems are generally known, see for example: U.S. Pat. Nos. 5,204,672, 8,126,450, 8,299,895, 8,410,899, 8,538,408, US 2010/0128570, US 2012/0306618, US2013/0102263, U.S. Pat. Nos. 7,259,679, 7,577,406, 8,588,715, US 2013/0271327, U.S. Pat. Nos. 6,288,652, 8,232,863, US2007/0252728, US 2013/0278381, US 2010/0219935, U.S. Pat. Nos. 7,350,949, 7,866,728, US 2008/0296929, U.S. Pat. Nos. 8,534,743, 7,547,058, 8,451,087, 7,248,151, 7,327,215, 8,700,267, 8,400,265, 7,255,466, 7,400,232 and US 2012/0032463.

Technologies offering keyless entry include keypads and key fobs. Some users of keypads may find the use inconvenient as it presents yet another number combination among so many that must be memorized in daily life. Key fob technology provides an avenue for keyless entry without the need to memorize a pass code. Key fobs allow vehicle communication at a generous distance from the vehicle. Although convenient the signals from the key fob can be intercepted and later used to access the vehicle, creating theft risks for the vehicle and security risks for the user.

SUMMARY

What is disclosed herein is a keyless entry system including near field communications (NFC). In a particular embodiment there is provided a vehicular keyless entry system that is integrated with a vehicle trim component. Also described herein is a keyless entry system including an NFC device and a keypad.

In one embodiment there is described a vehicular keyless entry system including an electronic circuit, a NFC device integrated with the electronic circuit, a NFC antenna and a door lock system electronically coupled with the electronic circuit. The NFC device may include an NFC receiver for receiving an external NFC signal.

In another embodiment there is described a vehicular keyless entry system wherein the electronic circuit is electronically coupled with the vehicle electronics system.

In another embodiment there is described a vehicular keyless entry system wherein the electronics may further include a CAN or LIN communication device coupled with an output device for communicating with a vehicle electronics system.

In another embodiment there is described a vehicular keyless entry system which includes an electronic circuit, a NFC device integrated with the electronic circuit, a keypad coupled with the NFC device, a door lock system electronically coupled with the electronic circuit.

In another embodiment, there is described a vehicular keyless entry system with an electronic circuit, an NFC device integrated with the electronic circuit, a keypad coupled with the NFC device, a NFC antenna and a door lock control electronically coupled with the electronic circuit.

In another embodiment there is disclosed a keypad with nondescript pattern or numeric code actuation. Such a vehicular keyless entry system may include a key pad, an electronic circuit coupled with the electronic circuit, a door lock system coupled with the electronic circuit, the door lock system including a lock actuator, the door lock actuator being actuated by a signal produced by a nondescript pattern entered at the key pad.

BRIEF DESCRIPTION OF THE DRAWINGS

The following detailed description of preferred implementations and best mode will be set forth with regard to the accompanying drawings, in which:

FIG. 1 shows a vehicle door frame with a vehicle trim piece having a keyless entry with a NFC assembly;

FIG. 2 shows a vehicle trim piece having a keyless entry with an NFC assembly;

FIG. 3 shows a keyless entry system with a keypad system;

DETAILED DESCRIPTION

Figure 4:
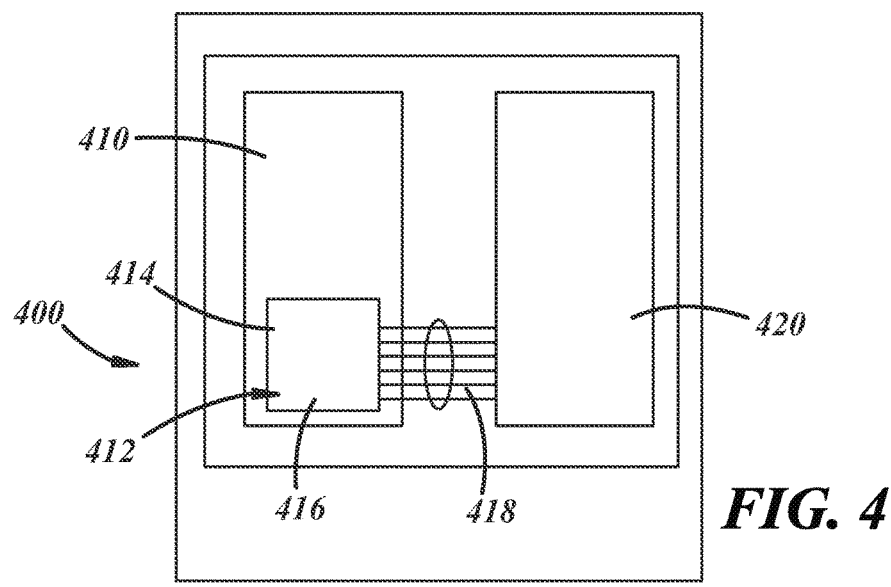
FIG. 4 shows a block diagram of a vehicle trim piece with a keyless entry system having an NFC assembly connected to a vehicle electrical system.

As described herein there is disclosed a keyless entry system including a Near Field Communications (NFC) assembly. The keyless entry system may be electronically coupled to a door lock system. In a particular embodiment there is provided a vehicular keyless entry system with a NFC assembly that is integrated with a vehicle trim component. In an alternative embodiment the NFC assembly can be used independently or combined with a more traditional keypad and code system. The keypad can have numbers, letters or use a sequential pattern, by way of non-limiting examples.

NFC includes a set of short-range wireless technologies. NFC communication requires an NFC enabled smart device or NFC tag to be in close proximity to an NFC reader (for example, less than 20 cm). Communication over a short distance can provide a more secure signal, as the shorter range signal transmissions cannot be easily detected at large distances. As such the NFC signals are less likely to be intercepted or modified as compared to RF signals sent over longer distances.

NFC may involve an initiator and a target. The initiator can actively generate an RF field that can power a passive target. This enables NFC targets to take on a very simple form, such as tags, stickers, key fobs, or cards that do not require batteries or other power source. NFC peer-to-peer communication is possible, provided both devices are powered. The NFC assembly can communicate with either an active device such as a smart phone or with a passive device, such as a NFC tag. Active communications may allow 1-way or 2-way transfer of data. Active-passive communication may allow 1-way transfer of data. Either type of NFC communication can be used to unlock or "wake-up" a vehicle.

The NFC assembly can be positioned behind, embedded in or otherwise carried by a trim piece. A portion of the trim piece may be translucent such that it allows light to pass through. A translucent trim piece can be used to shine an indicator light to show communication activity or related activity. NFC devices positioned behind the trim piece may operate through the exterior trim piece or plastic capping without any physical opening. Therefore the exterior trim piece can have a better appearance and may be easier to manufacture. The NCF electronics may also be better protected from environmental elements (rain, water, ice, sunlight, etc.) than other button or grid based systems that are visible to a user, and or received in or behind an opening in the trim piece.

The NFC assembly can provide NFC through snow or ice. Actuation does not rely on pressure, capacitance or heat, as such the NFC system maybe touchless. Therefore a user can just hold the smart device or device including an NFC tag up to the vehicle and not have to take off gloves, wear special gloves, or remove frost or ice from vehicle.

NFC with a smart device, such as a smart phone, can enable data sharing between the vehicle and smart device, and control of the vehicle via computer programs, software applications, and/or smart device apps. As a very simple example, the vehicle can send a message to a smart phone during vehicle unlocking that tells the operator that the gas tank is almost empty and needs to be filled. The NFC assembly may also be combined with a keypad. In such cases the electronic circuit and key pad can be used to unlock various doors and unlock and/or open a trunk or a liftgate.

FIG. 1 shows a vehicle door frame 8 with a trim piece 10 having a keyless entry system 12 including an electronic circuit 14 with an NFC device 16. FIG. 2 shows an example trim piece 200 including a keyless entry system 210. The trim piece as shown is a pillar capping, such as a B-pillar capping. The capping may be made of any suitable material including plastic. The trim piece may include a translucent material in front of at least a portion of the keyless entry system. A translucent material is a material that may allow light indicators to shine to show activation of the keyless entry system. As shown the trim piece 200 has supports which are formed to receive and hold the keyless entry system.

Figure 6:
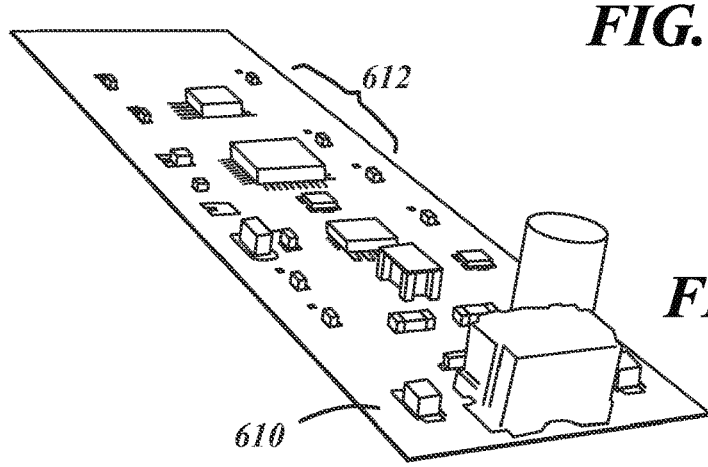
FIG. 6 shows an example circuit board with an NFC assembly.
Figure 7:
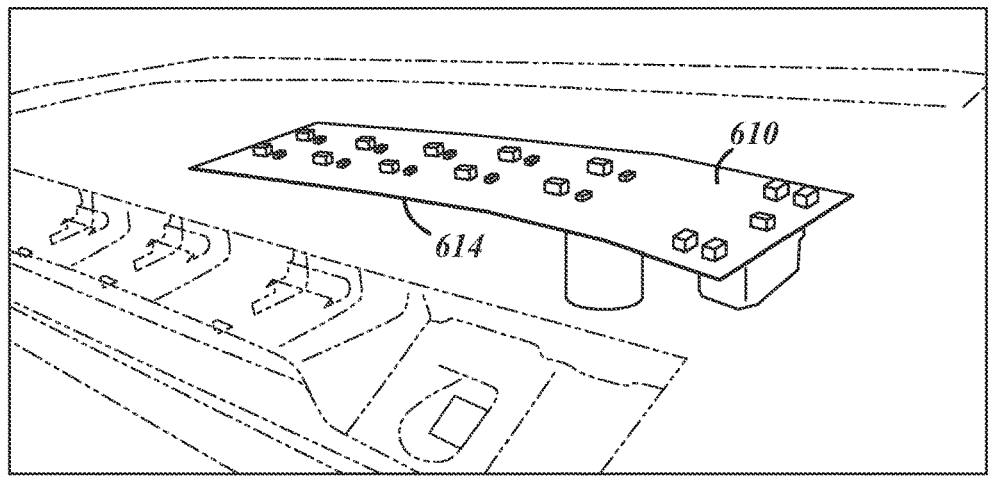
FIG. 7 shows a trim piece with an example flexible circuit board with an NFC assembly.

FIG. 6 and FIG. 7 show an example circuit board 610 with an NCF chip set 612. As shown in FIG. 6 the circuit board is a flexible circuit board 614. A preferred vehicle trim piece(s) with an NCF assembly will be one that is on or near the driver's door although other locations may be used as desired. Examples of suitable vehicle components with electronics include a B-Pillar trim, belt-line molding, mirror housing or door handle.

FIG. 4 shows a block diagram of a keyless entry system 400 for a vehicle with a trim piece 410 and an NFC assembly 412. The NFC assembly 412 includes an electronic circuit 416. As shown in this embodiment, the electronic circuit 416 includes a NFC reader device 414. The NFC reader device 416 may be provided by a Near Field Communications (NFC) chip or chip set. The assembly may also include an electrical connector 418 and/or electrical harness with wires to connect to a vehicle electrical system 420.

The complete electronic circuit may include one or more of the following: Controller Area Network (CAN) communication device, Local Interconnect Network (LIN) communication device, microcontroller, power supplier or converter, a NFC antenna and/or various discrete electronic devices.

Figure 5:
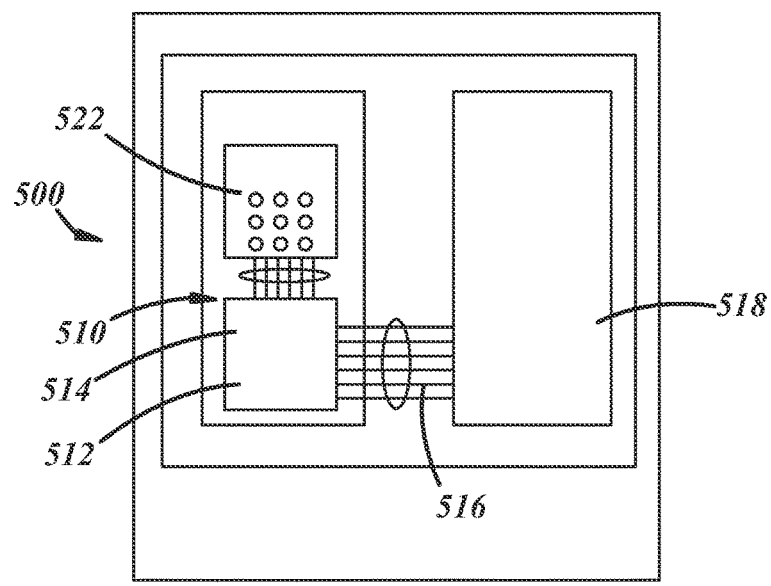
FIG. 5 shows a block diagram of a vehicle trim piece with a keyless entry system having an NFC assembly and a keypad connected to a vehicle electrical system.

FIG. 5 shows a block diagram of another keyless entry system 500 with an NFC assembly 510. As shown in this embodiment, the NFC assembly 510 includes an electronic circuit 512 with a NFC antenna and NFC reader device 514. The NFC reader device 514 may be a Near Field Communications (NFC) chip or chip set. The NFC assembly 510 may include an electrical connector 516 and/or electrical harness with wires to connect to a vehicle electrical system 518.

As shown, the NFC assembly 510 is integrated into an electronic circuit and combined with a keypad 522. In practice the vehicle can be unlocked or controlled by either the keypad or by communication with an NFC device held by or carried on the operator. The keypad 522 may use any form of actuation including electro-mechanical switches, pressure sensitive devices, heat sensing, or capacitive touch. The electronic circuit 512 is connected to the vehicle electrical system 518. The complete electronic circuit may include one or more of the following: Controller Area Network (CAN), device, Local Interconnect Network (LIN) communication device, microcontroller, power supplier or converter, NFC antenna and/or various discrete electronic devices.

As shown, in FIG. 3 the keypad 300 may include a series of symbols 310 or indicia with nondescript pattern actuation 312. As shown therein the pattern has nine symbols represented by circles. The vehicular keyless entry system may include a key pad, an electronic circuit coupled with the key pad, a door lock system coupled with the electronic circuit, the door lock system including a lock actuator, the door lock actuator being actuated by a signal produced by a nondescript pattern entered at the key pad. The keypad symbols could include any desired indicia, marking or indicator including numerals, letters, indentations, protrusions/bumps or other things enabling or facilitating entry of a code by sequential actuation of different areas of the keypad associated with such indicia or marking. The area for pattern recognition may be the same as or different than the area for indicia code entry and/or they may overlap as desired. Taking the non-limiting example of FIG. 3, the circles shown could include numerals (or numerals may be provided without any circles) and the pattern may involve tracing over the numerals in a preset sequence, or discretely pressing or otherwise actuating the keypad in a preset sequence.

In at least some implementations, such as is shown in FIGS. 8-11, the vehicular keyless entry system 700 may include components incorporated into or carried by a vehicle trim piece 702. In the implementation shown, the trim piece 702 is a polymeric body called a "capping 702". The capping 702 has an outer surface 704 that may define at least part of an exterior surface of the vehicle (which is viewable from and exposed to the outside of the vehicle), or the capping 702 may carry or be coupled to a component or applique that defines the vehicle exterior surface. The capping 702 may further include an inner surface 706.

In at least some implementations, the capping 702 includes a mount 708 for at least some components of the vehicular keyless entry system, and the mount 708 may be provided on or in the inner surface 706 of the capping 702. In the implementation shown, the mount includes a recess 710 extending inwardly and toward the outer surface 704 and may also include one or more pegs or other retaining features. The recess 710 may include an opening 712 extending through the capping 702, including through the outer surface 704 if desired, to provide physical access to a keypad or other user interface with which manual interaction is desired. Otherwise, the recess 710 may include a bottom wall 714 that is adjacent but not open to the outer surface 704 (e.g. where only NFC is desired for actuation and manual interaction with an interface is not intended).

Figure 8:
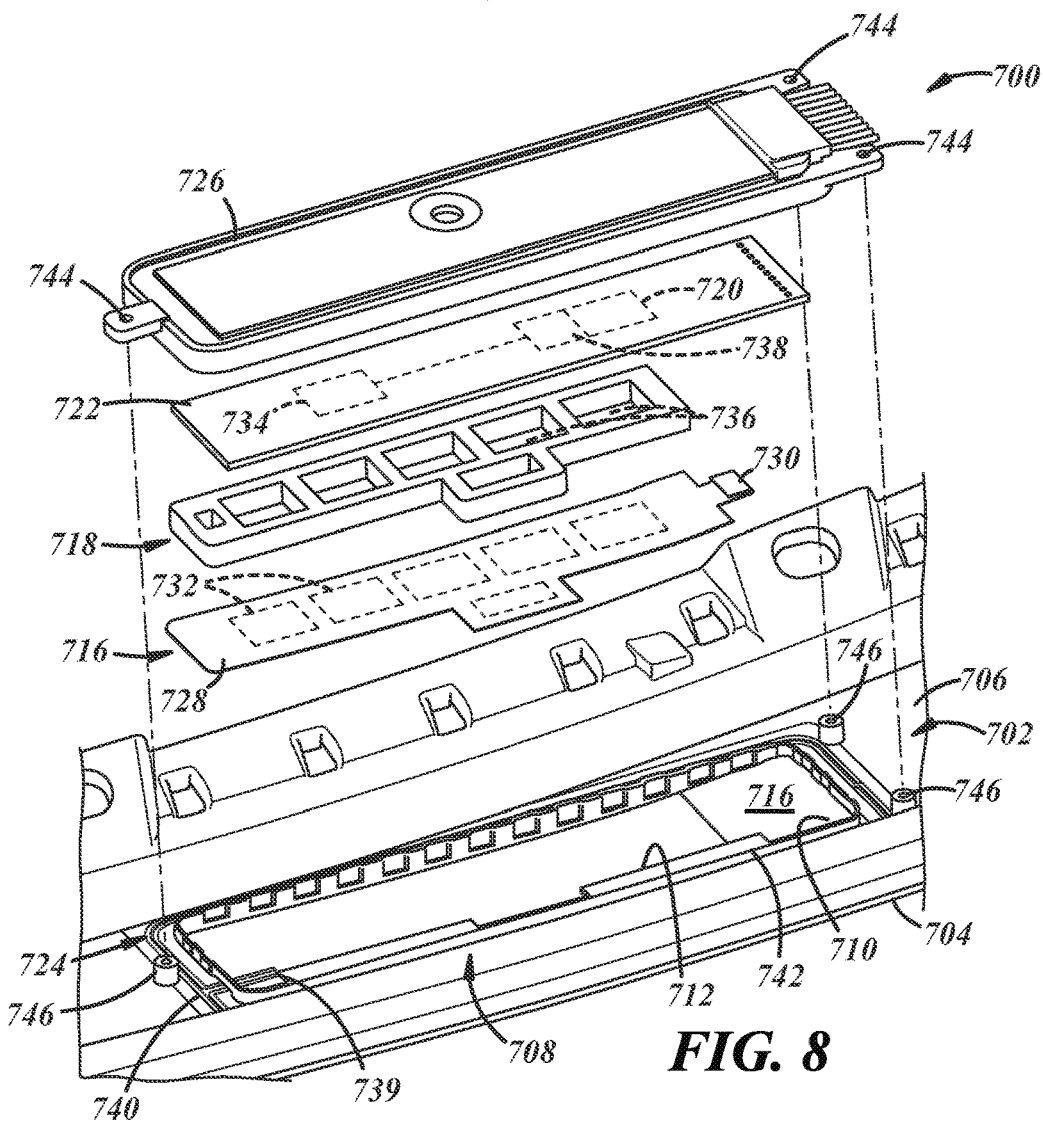
FIG. 8 shows an exploded view of a keyless entry system incorporated within a body of a trim piece or capping.

To facilitate mounting the vehicular keyless entry system components to the capping 702, one or more of the components may be at least partially received within the recess 710. As shown in FIG. 8, the vehicular keyless entry system may include a user interface 716, an intermediate member 718, an electronic circuit 720 (which may be implemented on/with a printed circuit board 722), an antenna 724 and a cover 726.

The user interface 716 may define at least part of an input device responsive to user actions to provide a signal to the electronic circuit 720. The interface 716 may be adapted to be manually engaged by a user to input a desired code, pattern or the like, as noted above, to unlock a vehicle door or enable another vehicle function (e.g. turning on interior or exterior lights, actuating a vehicle horn or alarm, etc.). The interface 716 may be implemented as a flexible membrane or substrate 728 responsive to a user input (e.g. touch/pressure sensitive, heat or capacitive input, to name a few examples) that is carried by the capping 702 and electrically connected or communicated with the electronic circuit 720. Suitable weather sealing may be provided between the interface 716 and the capping 702, as desired, to prevent contaminants from fouling the system electronics. The interface 716 may include any desired connection with the controller, and is shown as including an electrical connector 730 that is coupled to one or more sensors or sensory areas 732 on or within the interface 716. The sensors or sensory areas 732 are responsive to manual user inputs and may include conductive capacitive sensors (e.g. touching the interface 716 or a cover over the member to complete the circuit). The electrical connector 730 may be adapted to be connected to the electronic circuit 720 so that signals generated by user interaction with the interface 716 are transmitted to a controller 734, which may be part of the electronic circuit 720 on the circuit board 722, or could be remotely located from the circuit board 722. In the implementation shown, the electrical connector 730 includes a ZIF connector which mates with a complementary connector on the circuit board 722. Another connector could comprise conductive pads disposed on the circuit board and conductive pins, (which may be biased) 115 coupled to the interface 716.

The intermediate member 718 (if one is provided) may act as a buffer or spacer between the interface 716 and the controller/circuit board 722, to inhibit or prevent direct physical contact of the circuit board 722 by the interface 716. The intermediate member may permit light to pass through the intermediate member (e.g. from circuit board mounted LED's or the like) to the interface member, which may permit transmission of the light therethrough that is visible to a user to provide a desired signal or indication to the user. The intermediate member may be a foam pad. The intermediate member 718 may include a body received between the interface 716 and the circuit board 722, and the body may have one or more openings 736 providing discrete areas of the interface 716 that are not directly overlapped or supported by the intermediate member 718. These areas may permit light to pass from the circuit board to the interface, where the tight provides some signal or indication to a user (e.g. that the system is operating, that a command or signal has been detected/received, etc.).

The electronic circuit 720 may include or be coupled with a suitable microcontroller 734 or processor as well as a NFC device 738, such as an initiator or target. The NFC device 738 may be passive or powered to enable one-way or two-way communication with a coupled NFC device (e.g. an initiator). The NFC device 738 may be responsive to provide a signal to or communicate with an authorized external NFC device (e.g. a target) located within range of the electronic circuit 720 for NFC. While the target could be coupled to the electronic circuit 720 and the external NFC device may include a NFC initiator, the following description will be directed to an arrangement wherein the NFC initiator is the device 738 carried by the electronic circuit 720 and the NFC target is carried by a user for selective coupling/registration with the vehicle-mounted NFC initiator. The NFC device 738 coupled to the electronic circuit 720 may be any suitable device, the description herein is not intended to limit the disclosure to any particular device or type of device. The electronic circuit 720 may also include, be connected to or communicated with a vehicle interface 750 which may be connected to or communicated with a vehicle BUS 752 (see e.g. FIG. 11) or other vehicle system to permit a commanded function to be carried out within the vehicle (e.g. change the state of a door lock).

Figure 11:
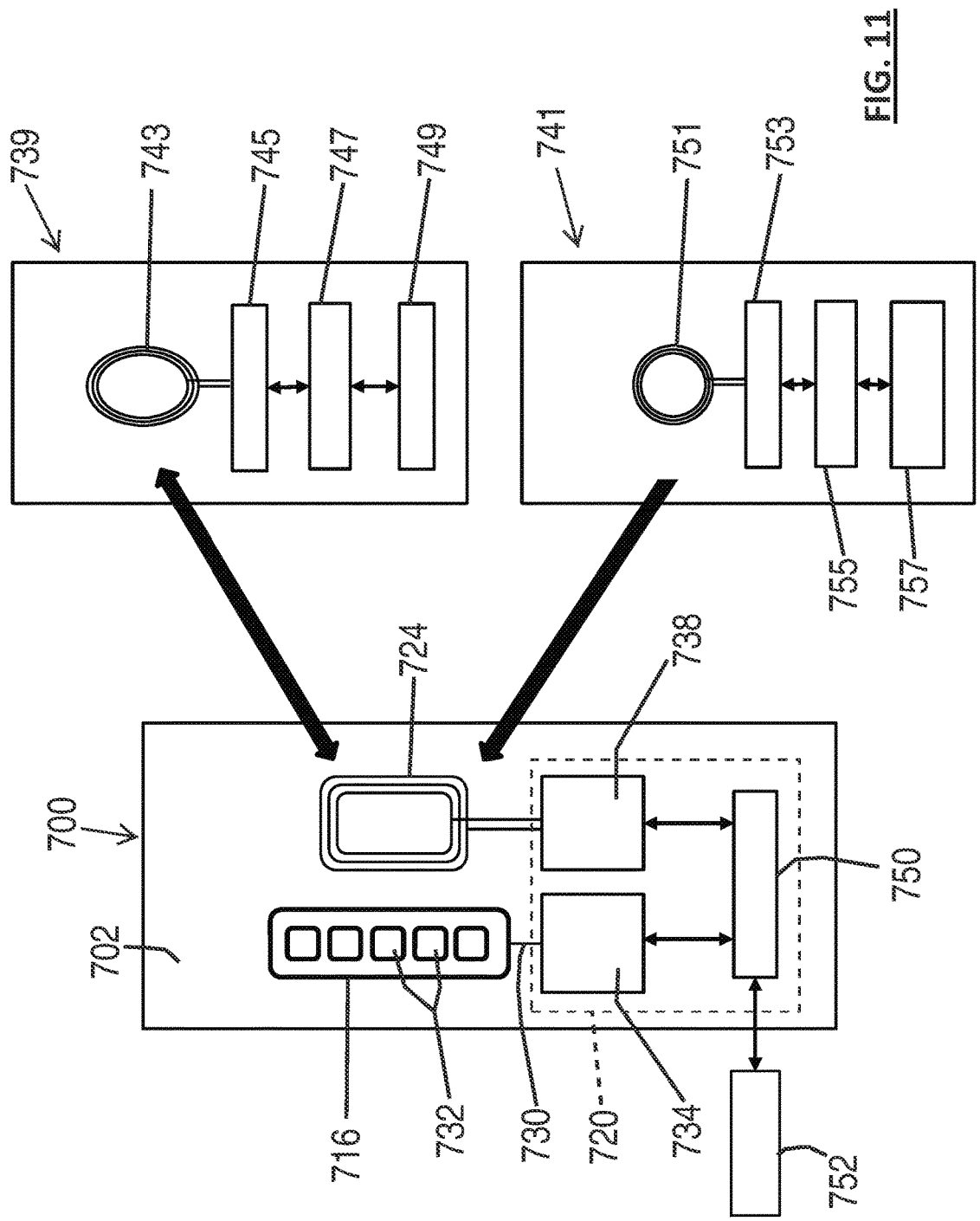
FIG. 11 is a system schematic illustrating a vehicle mounted NFC assembly and exterior NFC devices that may be used therewith.

In FIG. 11, two NFC devices are shown. The NFC devices include a smartphone 739 or other device capable of one-way and/or two-way communication with the vehicle, and a NFC tag, card key or the like capable of one-way communication with the vehicle. The first NFC device 739 may include an antenna 743 coupled to a suitable RF signal interface/electronic circuit 745 which may in turn be coupled to or communicated with a software application and/or controller 747 which is responsive to a user interface 749 or input. The second NFC device 741 may include an antenna 751 that is coupled to a RF interface/electronic circuit 753 that is coupled to a controller 755 which may be communicated with or connected to a memory source or device 757. Hence, the NFC devices 739, 741 may receive a NFC signal provided from the vehicle-mounted NFC initiator 738 to cause a desired output from the vehicle electronic circuit. At least with a NFC device that permits two-way communication (e.g. device 739), data or other signals may be transmitted from the vehicle to the external NFC device which may include software or other programming and a user interface, as desired.

To provide a NFC signal from the NFC device 738 to a NFC target (e.g. component 739 or 741 in FIG. 11), the antenna 724 is coupled to the NFC device 738 and may be arranged to enhance the signal strength and thereby improve the function and/or operating distance of the system. The antenna 724 may be a loop type antenna having any desired arrangement including any desired material(s) defining the antenna conductor 740 such as, without limitation, silver-based conductors, copper-based conductors or low resistance inks. In at least some implementations, the antenna 724 has an overall resistance of 10 ohms or less, with 5 ohms or less currently believed to be preferable in at least some applications. Further, the antenna 724 may provide or span a desired area for improved signal integrity and/or strength. In general, a greater antenna surface area (i.e. larger antenna) enabling a greater communication range (i.e. the distance between NFC initiator and NFC target). In at least some implementations, the antenna may have a surface area between 1 $cm^2$ and 100 $cm^2$, if desired. Of course, other sizes may be used as desired. Also, the antenna may be formed from a number of wire wraps or turns, and more turns increases the distance the antenna may communicate across.

In at least some implementations, the antenna 724 is carried by the capping 702 such that at least part of the antenna 724 is at the capping inner surface 706 or below the capping inner surface 706. The antenna 724 may be embedded within the capping structure. And the antenna could be received in a groove or recess 710 formed in the capping 702, or it may be embedded within the capping structure, such as by being overmolded within the capping 702. In some implementations, all of the antenna 724 except for a portion leading to the circuit board 722 may be generally parallel to the outer surface 704 and may be located relatively close the outer surface for enhanced signal communication. In some forms, the antenna 724 may be generally planar, or may be contoured to match a contour of an adjacent portion of the outer surface 704 and maintain an at least somewhat uniform distance from the outer surface 704 along at least a majority of the antenna 724. This close proximity to the outer surface 704 may improve communication/signal distance and may increase the distance from the antenna 724 at which a NFC device may be detected to facilitate use of the NFC keyless entry system. The ends or leads 739 of the antenna conductor 740 may be coupled in any suitable way to the circuit board 722 for communication with the NFC device 738.

Figure 9:
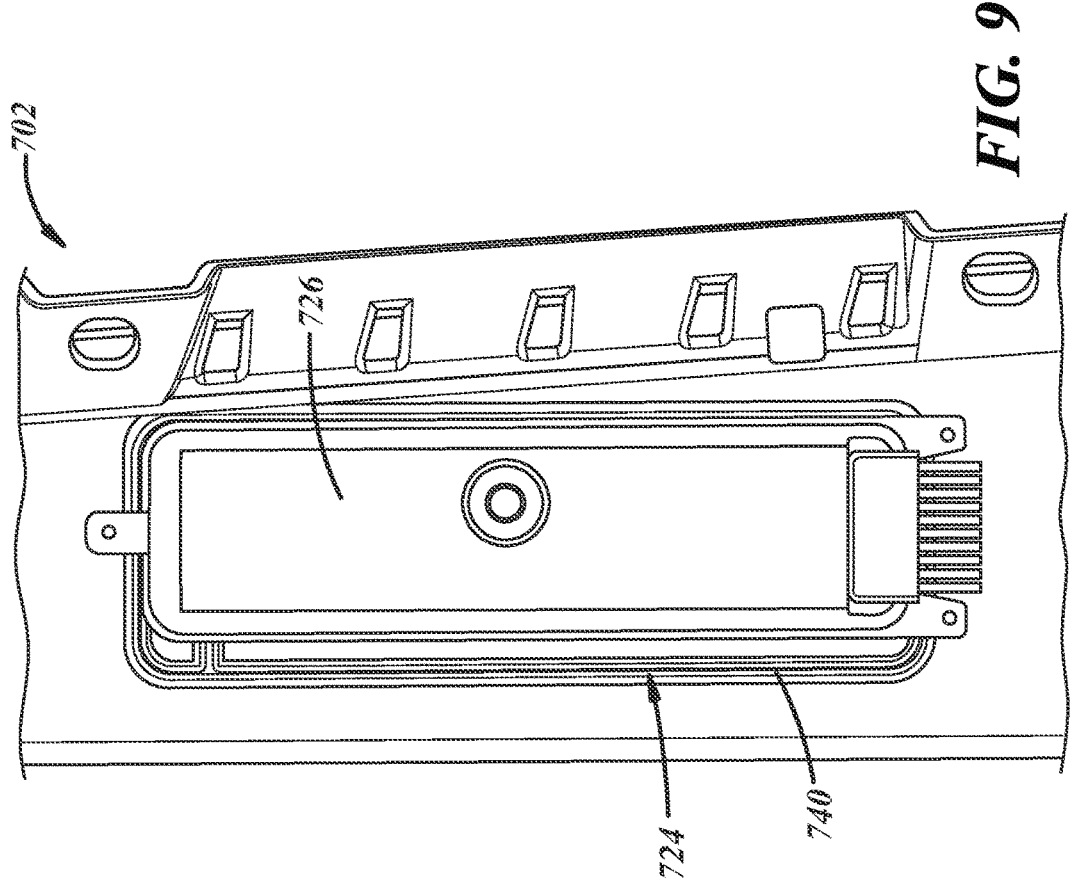
FIG. 9 shows a top view of a portion of the capping with a cover installed.
Figure 10:
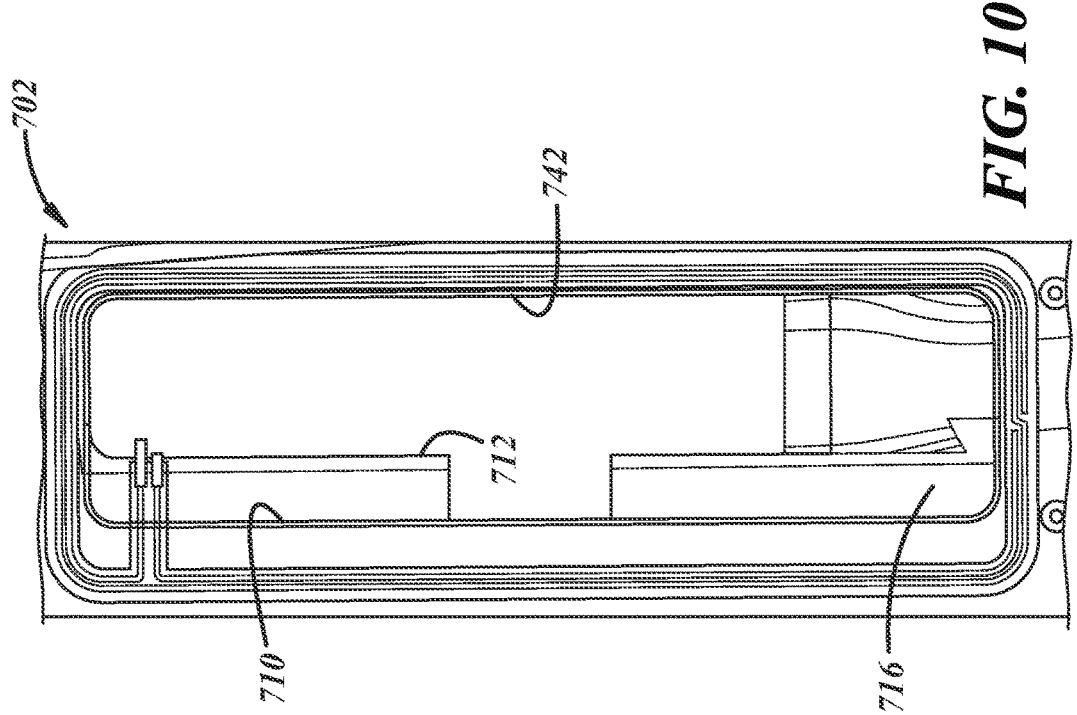
FIG. 10 is similar to FIG. 9 with the cover removed and showing an antenna received around a recess formed in the capping.

In at least some forms, the antenna 724 surrounds at least part of the electronic circuit 720/circuit board 722, and in the implementations shown in FIGS. 8-10 the antenna 724 surrounds at least part of, and up to all of, the circuit board 722. That is, the antenna 724 is received primarily outboard of the circuit board 722, and is shown as being outboard of a raised lip 742 defining one or more edges of the recess 710. While the antenna 724 is shown as being generally rectangular and surrounding all the circuit board, the antenna 724 could surround less of the recess 710 and circuit board 722, or more, including all of the recess 710 and circuit board 722 (such as is shown in FIGS. 9 and 10). As shown, part of the antenna 724 may extend into the recess 710 for connection to the circuit board 722, if desired. Otherwise, a connector may connect the outboard antenna with the circuit board 722 provided within the recess 710. In other embodiments, the antenna may be received more or entirety within the recess 710, the antenna may be carried by the circuit board 722, intermediate member 718, interface 716 or the cover 726, or some combination of these components optionally including the capping 702, to name a few of many possibilities. Additionally, the antenna 724 may be spaced from and not surrounding the circuit board 722 or recess 710, which may provide a different area for a user to register the NFC initiator with the system than the area of the interface 716. That area may be immediately adjacent to the interface 716 or spaced therefrom by any desired distance.

In at least some implementations, it may be desirable to space the antenna from metallic vehicle components at a distance sufficient to avoid substantial interference with the antenna signal. Representative metal components include vehicle door structures, vehicle trim, vehicle frame/structural members.

The cover 726 may be secured to the capping 702 and received over the circuit board 722 to protect the circuit board 722 and related components from impact or contaminants. To provide a seal with the capping 702, the cover 726 may include a peripheral rim received over or within and adjacent to the lip of the recess 710 and, if desired, a seal may be positioned between them. The cover 726 may include connection features adapted to cooperate with the mount features of the capping 702 to retain the cover 726 on the capping 702. In this regard, the cover 726 shown in FIGS. 8-10 includes openings 744 through which pegs 746 extending from the capping 702 are received. The pegs 746 may be snap-fit into the openings, glued, heat staked, welded or connectors like screws may be used to secure the cover 726 to the pegs where the pegs may include openings to receive the screws. The cover 726 may include an electrical connector that is coupled to the circuit board 722 and to an external vehicle circuit. In this way, signals or commands from the controller may be communicated with vehicle systems (perhaps via one or more vehicle control units), such as a power door lock to actuate the door lock as desired. This may change the state of the door lock from locked to unlocked or vice versa. Of course, other vehicle systems/control units may be communicated with and responsive to the keyless entry system, including but not limited to, comfort convenience controllers, such as seat settings, mirror positions, climate control, vehicle interior or exterior lights and a vehicle horn or alarm. The antenna 724 may be located outboard of the recess 710 and its lip 742 and inboard of the mounting features to which the cover 726 is connected so that the antenna 724 is covered or overlapped by the cover 726. This may protect the antenna 724 from damage such as may occur during installation of adjacent components like an interior trim piece and/or may retain the antenna 724 in position relative to the capping 702.

With the antenna 724 in the area of the recess 710, a user may utilize two methods for keyless entry in the same area of the vehicle (e.g. the area of the interface 716). One method includes the NFC arrangement and the other includes user interaction with the interface 716. Flaying both systems operable in the same area of the vehicle may enhance the convenience and user experience with the keyless entry system as either system may be used as desired. In this regard, the interface 716 may include indicia to identify that area of the vehicle (i.e. the area including the interface 716) as the area for use with the NFC device so that the user knows to place the NFC target/device (e.g. components 739, 741) within a certain range of the interface 716 in order to actuate the NFC keyless entry system. Of course, the antenna 724 may be spaced from the circuit board or recess 710 or interface 716 such that the antenna 724 does not at all or only partially surrounds or overlaps the circuit board 722 or interface 716. In this instance, the NFC keyless entry system might still work when the NFC target is positioned near the interface 716 and/or a separate area of the vehicle may be used for the NFC system (i.e. the initiator would operate when positioned near or at a different location than the interface 716). With the antenna 724 positioned in close proximity to the vehicle outer surface (e.g. 2 mm or less), the NFC keyless entry system may be more responsive, may operate with a lower strength signal from the initiator, may require less power from the initiator, and/or may permit a target to be positioned further from the vehicle outer surface during operation of the system. Of course, the antenna may be positioned at other distances from the vehicle outer surface, as desired.

While the forms of the disclosure constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. A vehicular keyless entry system comprising: an electronic circuit, a NFC device integrated with the electronic circuit, a door lock system electronically coupled with the electronic circuit, and a pillar capping having an outer surface defining a portion of an exterior surface of the vehicle and an inner surface, the inner surface including a mount for carrying the NFC device and the mount including a recess extending toward the outer surface, and wherein when installed on a vehicle, the NFC device is positioned behind the pillar capping, and the NFC device operates to receive an NFC signal through the pillar capping.

2. The keyless entry system of claim 1 wherein the electronic circuit is adapted to be communicated with a controller for the door lock system and the signal provided from the interface is capable of causing the electronic circuit to issue a command to the controller to change the state of a vehicle door lock.

3. The keyless entry system of claim 1 wherein the NFC device includes an NFC initiator for transmitting a NFC signal.

4. The keyless entry system of claim 1 wherein the electronic circuit is electronically coupled with the vehicle electronics system.

5. The keyless entry system of claim 1 wherein the electronic circuit includes a CAN or LIN communication device coupled with an output device for transmitting information to a vehicle electronics system.

6. The keyless entry system of claim 1 which further comprises a keypad coupled with the NFC device.

7. The keyless entry system of claim 6 wherein the keypad includes a signal generated by a nondescript pattern or entered code.

8. The keyless entry system of claim 6 wherein the door lock system includes a lock actuator that is actuated by a signal produced by a nondescript pattern entered at the key pad.

9. The keyless entry system of claim 1 which also includes an antenna communicated with at least one of the NFC device and the electronic circuit for communication of a NFC signal.

10. The keyless entry system of claim 1 wherein the recess defines a thinner section of the pillar capping with a smaller distance between the inner surface and outer surface.

11. The keyless entry system of claim 10 wherein the NFC device includes an antenna and the antenna is received within the thinner section of the pillar capping.

12. The keyless entry system of claim 1 wherein the NFC device includes an interface including an indicia that is visible through the outer surface.

13. The keyless entry system of claim 12 wherein the pillar capping includes a translucent material between the outer surface and the NFC device.

14. A vehicular keyless entry system, comprising:
a keyless entry system including an electronic circuit and an NFC device integrated with the electronic circuit, wherein the keyless entry system is electronically coupled to a door lock to unlock a vehicle door in response to receiving an NFC communication signal;
a pillar capping having an outer surface defining a portion of an exterior surface of the vehicle and an inner surface, the inner surface including a mount for carrying a portion of the keyless entry system, and
wherein when installed on a vehicle, the NFC device is positioned behind the pillar capping, and the NFC device operates to receive an NFC signal through the pillar capping and the NFC device includes an interface including an indicia that is visible through the outer surface.

15. The vehicular keyless entry system of claim 14, wherein the NFC device is spaced between the top and bottom ends of the pillar capping when installed on a door, and between edges of the pillar capping connecting the top and bottom ends.

16. The vehicular keyless entry system of claim 14, wherein the keyless entry system further includes an antenna carried by the capping.

17. The vehicular keyless entry system of claim 16, wherein at least part of the antenna is at the inner surface of the capping.

18. The vehicular keyless entry system of claim 16, wherein the antenna is contoured to match a contour of an adjacent portion of the outer surface and maintain an at least somewhat uniform distance from the outer surface along at least a majority of the antenna.

19. The vehicular keyless entry system of claim 16, wherein the antenna is a loop type antenna made from a silver-based conductor, copper-based conductor or low resistance ink.

20. The vehicular keyless entry system of claim 14, which also includes a cover that includes connection features adapted to cooperate with the mount of the capping to retain the cover on the capping.

21. The vehicular keyless entry system of claim 20, wherein the cover includes openings through which pegs extending from the capping are received, and wherein the pegs may be snap-fit, glued, heat staked, welded or screwed to secure the cover to the pegs.

22. The vehicular keyless entry system of claim 14, wherein the pillar capping includes a translucent material in front of at least a portion of the keyless entry system to allow light indicators on the keyless entry system to shine through the translucent material to on activation of the keyless entry system.

23. The vehicular keyless entry system of claim 14, wherein the NFC device is passive, enabling one-way communication with a coupled external NFC device.

24. The vehicular keyless entry system of claim 14, wherein the NFC device is powered, enabling two-way communication with a coupled external NFC device.

* * * * *